Patented June 20, 1950

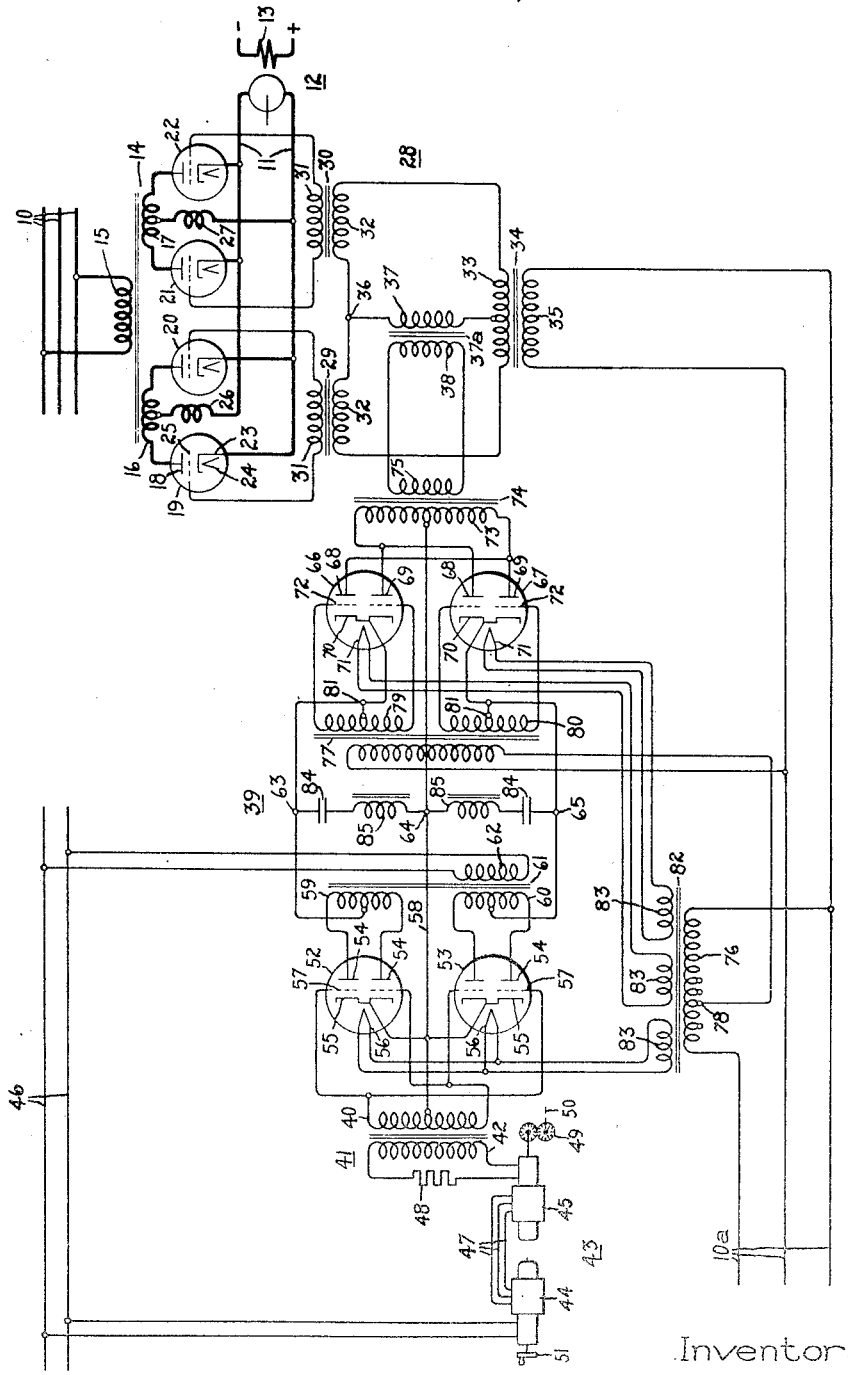
June 20, 1950
G. H. PETTIBONE ET AL
2,512,377
DUAL FREQUENCY ELECTRIC CONTROL CIRCUIT
Filed Nov. 16, 1940
Inventors:
George H. Pettibone,
John L. Bower,
by Harry E. Dunham
His Attorney.

2,512,377

UNITED STATES PATENT OFFICE 2,512,377

DUAL FREQUENCY ELECTRIC CONTROL CIRCUIT

George H. Pettibone, Scotia, and John L. Bower, Schenectady, N. Y., assignors to General Electric Company, a corporation of New York Application November 16, 1940, Serial No. 365,966

3 Claims. (Cl. 318—30)

Our invention relates to electric control circuits and more particularly to control circuits for controlling electric valve translating apparatus of the type employed in follow-up systems.

Our invention is particularly useful in connection with systems in which the direction and magnitude of the torque of an electric motor is controlled by an electric valve converting system in response to a control voltage. In the case of a follow-up system, the control voltage may be dependent upon the position of a movable element controlled by the electric motor, with respect to the position of a movable element of a motion directing or transmitting apparatus. In systems of this character the equipment from which the control voltage is derived is usually energized by an alternating current voltage and the control voltage obtained from the motion receiving device varies in magnitude with the displacement between the movable elements of the motion transmitter and motion receiver and reverses in phase when the relative displacement of these elements reverses. It is often desirable to energize the electric valve converting system from an alternating current circuit, the frequency and phase position of the voltage of which is not fixed with respect to the frequency and phase relation of the voltage of the electric circuit from which the motion transmitting device is energized. Accordingly, we have provided means for converting the control voltage of the motion receiving device to an alternating current potential which varies in magnitude and reverses in phase in the same manner as does the control voltage obtained from the motion receiving device and which has the same frequency and a definite phase relation with respect to the alternating voltage of the circuit from which the electric valves of the electric valve translating apparatus are energized.

It is an object of our invention to provide an improved electric control circuit.

It is a further object of our invention to provide an improved electric control circuit especially adapted for use in connection with a follow-up system including an electric valve translating apparatus which renders the control voltage applied to the electric valves independent of variations in the frequency of the alternating current circuit from which the control voltage is obtained, has a small time constant and which operates to limit the potential impressed on the electric valves to a predetermined value regardless of the magnitude of the control voltage obtained from the motion receiving device.

In accordance with an illustrated embodiment of our invention, a pair of reversely connected biphase rectifiers interconnect one phase of a three-phase alternating current supply circuit and a load circuit comprising the armature of a direct current motor. The control members of the electric valves are energized by an alternating voltage made up of a plurality of components, one of which is fixed in phase and magnitude and derived from the three-phase alternating current supply circuit. The other component is an alternating current voltage which is obtained from the output of a motion receiving device having an element movable with a movable element operated by the electric motor. The control voltage varies in magnitude in accordance with the displacement between the motion receiving device and a motion transmitting or directing device and reverses in phase with a change in direction of the displacement between the movable elements of these devices. The motion transmitting device is energized from an alternating current circuit having a frequency and phase relation independent of the alternating current supply circuit from which the electric valve translating apparatus is energized. We provide means including a plurality of electric valves for converting the alternating control voltage produced by the motion receiving device to a control voltage having a definite phase relation and the same frequency as the alternating current supply voltage and which varies with variations of the control voltage produced by the motion receiving device with a negligible time delay within a predetermined range of variation in magnitude of the control voltage and remains substantially constant in magnitude after the magnitude of the control voltage attains the predetermined value.

Our invention will be better understood by reference to the following description taken in connection with the accompanying drawing and its scope will be pointed out in the appended claims. In the drawing the single figure is a schematic representation of one embodiment of our invention.

Referring now to the drawing, we have shown our invention embodied in a circuit for controlling the operation of an electric valve converting system for energizing a reversible direct current motor. The electric valve converting system interconnects a three-phase alternating current circuit 10 and a direct current circuit 11 from which the armature of a direct current motor 12 is energized. The field winding 13 of the motor may be energized from any suitable source of direct current (not shown). The electric valve converting system includes a pair of cross connected biphase rectifiers energized from the alternating current circuit 10 through a transformer 14 having a primary winding 15 and a pair of secondary windings 16 and 17. The end terminals of the windings 16 and 17 are connected to the anodes 18 of electric discharge valves 19-22 inclusive, preferably of the type utilizing an ionizable medium such as a gas or vapor and each comprising in addition to the anode 18 a cathode 23, a heater element 24, and a control member or grid 25. The cathodes of the electric valves 19 and 20 are connected together and to one side of the direct current circuit 11, while the cathodes of the valves 21 and 22 are connected together and to the other side of the direct current circuit 11. The direct current circuit of the biphase rectifier including valves 19 and 20 is completed through an inductive impedance element 26 to an intermediate terminal on the secondary winding 16. Similarly, the direct current circuit of the biphase rectifier including valves 21 and 22 is completed from the other side of the direct current circuit 11 through an inductive impedance element 27 to an intermediate terminal of the secondary winding 17. The operation of the reversely connected biphase rectifier to supply direct current of varying magnitude and opposite polarity to the dynamo-electric machine 12 is well understood by those skilled in the art. When the control members of the valves 19, 20, 21 and 22 are energized so that the outputs of the two biphase rectifiers are equal no voltage will be impressed on the armature of the motor 12. By advancing the excitation of the control members 25 of the valves associated with one of the windings 16 or 17 with respect to the excitation of the control members of the valves associated with the other of these windings the magnitude and polarity of the voltage impressed on the dynamo-electric machine 12 may be varied.

As illustrated in the drawing, the control members may be energized by an excitation circuit including transformers 29 and 30 associated with the valves of windings 16 and 17 respectively, and each comprising a secondary winding 31 having end terminals each connected with one of the control members 25 of the electric valves 19-22. The primary windings 32 of transformers 29 and 30 are connected to be energized by an alternating voltage made up of two components. One component is constant in magnitude and phase position and is obtained from the opposite end portions of the secondary winding 33 of a transformer 34 having a primary winding 35 energized from a supply of alternating voltage 10a having the same frequency and a fixed phase relation with respect to the alternating voltage of the main supply circuit 10. The phase of the voltage impressed on primary winding 35 is such that the component of voltage impressed on the control members 25 due to transformer 34 lag the anode-cathode voltages impressed on the electric valves 19-22 by substantially 120 electrical degrees. Connected between the common terminal 36 of the primary windings 32 of the transformers 29 and 30 and an intermediate terminal on the secondary winding 33 of the transformer 34 is the secondary winding 37 of a transformer 37a which has the primary winding 38 thereof energized from the output of a control circuit 39.

The output votage of control circuit 39 has the same frequency and a definite phase relation with respect to the voltage of circuits 10 and 10a and varies in magnitude in accordance with variations in the magnitude of a control voltage obtained from the secondary winding 40 of a transformer 41, the primary winding 42 of which is energized from the ouput of a suitable motion directing system illustrated generally by the numeral 43. The system includes a motion directing device 44 and a motion receiving device 45, each of which may comprise a stator element having a polyphase winding and a rotor element having a single phase winding. The particular construction of the devices 44 and 45 forms no part of our invention since they are available commercially under the trade name "Selsyn." The field winding of motion directing device 44 is energized from an alternating current circuit 46 the voltage of which has a frequency and phase position independent of the frequency and phase position of the voltage of circuits 10 and 10a. The phase terminals of polyphase stator windings of the devices 44 and 45 are connected together by conductors 47. The output of the motion directing system is obtained from the single phase rotor winding of the motion receiving device 45 and impressed on the primary winding 42 of transformer 41 through a circuit including a current limiting resistor 48. The rotatable element of motion receiving device 45 is made to occupy a definite position with respect to the movable element of the motor 12 and the movable object (not shown) driven thereby. In the particular arrangement illustrated this is accomplished by gearing 49 and shaft 50 which interconnect the rotatable elements of the device 45 and the motor 12. When the rotatable elements of devices 44 and 45 occupy the same position relative to their stator windings no voltage is induced in the field winding of the motion receiving device 45. If it is desired to operate the dynamo-electric machine 12 to position the device (not shown) driven thereby the movable element of the motion directing device 44 is rotated by any suitable means such as the handwheel 51. The relative positions of the rotatable elements of devices 44 and 45 with respect to their stator windings is changed by operation of the hand-wheel 51 and an output voltage is impressed on the transformer winding 41. This voltage is impressed on the transformer 38 by means of the control circuit 39 to control the conductivities of the electric valves 19 to 22 in such a manner as to operate the dynamo-electric machine 12 in a direction to bring the movable element of the motion receiving device 45 back into correspondence with the position of the movable element of the motion transmitting device 44. The control circuit 39 by which the control voltage obtained from the motion receiving device 45 is converted into a control voltage having the same frequency and a definite phase relation with respect to the alternating voltage of circuits 10 and 10a will now be described.

Circuit 39 includes a pair of full wave rectifier valves 52 and 53 each of which includes an envelope in which are mounted a pair of anodes 54, a pair of cathodes 55, a heater element 56 and a pair of control members or grids 57. The rectifier valves 52 and 53 may be of any desired type but preferably are of the thermionic or high vacuum type. The cathodes of valves 52 and 53 are connected together and to a conductor 58 while the anodes of the valves 52 and 53 are connected respectively to the end terminals of the secondary windings 59 and 60 of a transformer 61, the primary winding 62 of which is energized from the alternating current circuit 46. The control members 57 of the valves 52 and 53 are energized by the control voltage obtained from the motion directing system by means of the secondary winding 40 of the transformer 41. As illustrated in the drawing, one end terminal of the winding 40 is connected with the control member associated with one anode of valve 52 and with the control member of valve 53 associated with the anode electrically displaced 180 degrees with respect to the anode of valve 52. Likewise the other terminal of secondary winding 40 is connected with the remaining control members of valves 52 and 53 which are associated with anodes displaced 180 electrical degrees with respect to each other.

With this arrangement it will be apparent to those skilled in the art that when the output voltage of the motion directing system impressed on transformer 42 has one phase relation with respect to the voltage of alternating current circuit 46, only the discharge paths of one of the valves, for example valve 52, will be rendered conductive by the control members 57 and a unidirectional voltage will be established between a terminal 63 connected with the midpoint of transformer winding 59 and the terminal 64 of the conductor 58 connected with the cathodes of the electric valves 52 and 53. If, due to a reversal in the relative displacement between the movable elements of the devices 44 and 45 the phase of the voltage impressed on transformer 41 is reversed with respect to the voltage of the circuit 46, the discharge paths associated with the other valve 53 will be rendered conductive and a direct current voltage will be established between the terminal 65 connected with the midpoint of the transformer winding 60 and the terminal 64. Inasmuch as the valves 52 and 53 are of the high vacuum type the magnitude of the control voltage impressed on transformer 42 will determine the magnitude of the direct current voltage appearing between terminals 63—64 and 64—65. The voltage appearing between terminals 63 and 65 may be considered a direct current control voltage which varies in magnitude with variations in magnitude of the alternating control voltage obtained from the moton directing system 43 and which reverses in polarity with a reversal in phase of the alternating control voltage. This voltage may be used to control the electric valve translating apparatus directly. In the preferred embodiment illustrated, the control circuit 39 is arranged to convert this direct current control voltage into an alternating voltage having the same frequency as the voltage of circuits 10 and 10a and a definite phase relation with respect thereto. The alternating control voltage obtained from the output of control circuit 39 also reverses in phase and varies in magnitude with a reversal in phase and a variation in magnitude of the voltage obtained from the motion directing system 43, but is otherwise independent of fluctuations in frequency and phase relation of the circuit 46 with respect to the alternating current circuits 10 and 10a. The voltages appearing between terminals 63—64 and 64—65 are impressed on the anode-cathode circuits of electric valves 66 and 67 which are preferably of the same construction as the electric valves 52 and 53. The valves 66 and 67 each include a pair of anodes 68 and 69, cathodes 70, a heater element 71 and control members 72. The voltage appearing between terminals 63 and 64 is impressed on the anode-cathode circuits of the valve 66 through the opposite halves of a winding 73 of a transformer 74. Similarly, the direct current control voltage appearing between terminals 64 and 65 is impressed on the anode-cathode circuits of the valve 67 through the opposite halves of the winding 73. The secondary winding 75 of transformer 74 is connected to energize transformer 37a of the excitation circuit 28 in accordance with the voltage induced therein by the current flowing in the opposite halves of primary winding 73. The conductivities of the electric valve means 66 and 67 are controlled in accordance with the alternating voltage of circuit 10a by means of a phase-splitting inductive winding 76 and an excitation transformer 77. One terminal of the primary winding of the excitation transformer is connected to one phase of the circuit 10a and the other terminal thereof is connected to an intermediate terminal 78 of the winding 76 which is energized from the remaining phase of the alternating current circuit 10a. The transformer 77 is provided with secondary windings 79 and 80 each of which is provided with an intermediate terminal 81 connected to the cathodes of electric valves 66 and 67, respectively, and have the end terminals thereof connected with the control members associated with anodes 68 and 69 of the electric valves 66 and 67, respectively. The phase-splitting inductive winding 76 may also form the primary winding of a transformer 82 the secondary windings 83 of which are connected with the heater elements of the electric valve means 52, 53 and 62, 67 to provide the necessary energy for heating the cathodes of the valves. The alternating current ripple in the output of electric valves 52 and 53 may be substantially eliminated by suitable filters connected between the terminals 63—64 and 64—65, and as illustrated, each may comprise a series connected capacitor 84 and an inductive impedance element 85.

From the preceding description it is apparent that the direct current circuit of electric valve 52 is completed from the terminals 63 through the anode-cathode circuits of electric valve 66 and the opposite halves of winding 73, terminal 64, and conductor 58 to the midpoint of transformer winding 40. Similarly, the direct current circuit of valve 53 is completed through the electric valve 67, the opposite halves of winding 73, terminal 64, conductor 58 and the midpoint of transformer winding 40. As was previously explained, when the control potential obtained from the motion receiving device 45 has one phase relation with respect to the alternating current circuit 46 the valve 52 is rendered conductive to impress a direct current potential between the terminals 63 and 64 which is in turn impressed on the anode-cathode circuits of electric valve 66. Inasmuch as the discharge paths of valve means 66 are controlled in accordance with the frequency of the alternating current circuit 10a the control voltage induced in the transformer winding 75 will have the same frequency and a definite phase relation with respect to the alternating current circuit 10. When the phase of the alternating control voltage obtained from the motion receiving device 45 reverses in response to a reversal in the relative displacement of the elements of the devices 44 and 45 electric valve means 53 is rendered conductive and the resultant direct current voltage impressed on the anode-cathode circuit of electric valve means 67. Because of the cross connection between the anodes of the valves 66 and 67 with respect to the winding 73 and the straight connection between control members 72 with the end terminals of windings 79 and 80 the phase relation of the voltage induced in winding 75 with respect to the alternating voltage of circuits 10 and 10a reverses when the transformer winding 74 is energized through the valve 67 as compared with the phase relation of this voltage when the transformer winding 74 is energized through the valve 66.

In view of the preceding detailed description of the operation of the various parts of the system embodying our invention, it is believed unnecessary to give a detailed description of the operation of the system. As previously described, movement of the movable element of the motion directing device 44 causes a voltage to be impressed on the transformer 41 which has a magnitude dependent upon the amount of the displacement. This control voltage is converted by the electric valves 52 and 53 to a direct current potential which varies in magnitude with the alternating control voltage and which reverses in polarity with a reversal in phase of the alternating control voltage. The direct current control voltage is converted to an alternating voltage having the frequency and a definite phase relation with respect to the circuits 10 and 10a by the electric valves 66 and 67. The output voltage of the control circuit 39 which includes these valves 52—53 and 66—67 is impressed on the excitation circuit 28 of the main electric valves 19—22 to vary the magnitude and polarity of the current supplied to the dynamo-electric machine 12 to operate the movable element thereof in a direction to bring the motion receiving device 45 into correspondence with the movable element of the motion directing device 44. Our invention, in addition to making it possible to energize the motion transmitting system from an alternating current circuit which is independent of the alternating current circuit from which the main electric valves are energized, also has numerous other advantages among which is an improvement in the wave form of the control voltage impressed on the transformer 37a over that derived directly from the motion receiving device 45. The arrangement also provides a linear relation between the magnitude of the alternating control voltage derived from the motion transmitting system and the voltage impressed on the excitation circuit 28 within a given range and beyond that, due to saturation of the electric valves, the control voltage is limited. This is particularly desirable in that when there is a large displacement between the motion directing and motion receiving devices the control voltage obtained from the motion receiving device is very large and requires some additional means to limit it in the absence of the control circuit 39 which automatically accomplishes this function.

While we have shown and described a particular embodiment of our invention, it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States is:

1. In combination, a first alternating current circuit, a second alternating current circuit having electrical characteristics independent of said first alternating current circuit, a direct current load circuit, electric valve means interconnecting said second alternating current circuit and said load circuit to supply direct current of variable magnitude and either polarity to said load circuit, a control circuit for controlling the conductivity of said electric valve means to vary the magnitude and polarity of the direct current supplied to said load circuit including means energized from said first alternating current circuit for producing an alternating current control voltage having a frequency and phase position dependent upon the frequency and phase position of the voltage of said first alternating current circuit, means for varying the amplitude and reversing the phase of said alternating current control voltage means for converting said control voltage into a second alternating control voltage having an amplitude dependent upon the amplitude of said alternating control voltage and a phase which reverses in response to a reversal in phase of said first alternating current control voltage, and means responsive to said second alternating current control voltage for controlling the conductivity of said electric valve means.

2. In combination, a first alternating current circuit, a second alternating current circuit having electrical characteristics independent of said first alternating current circuit, a direct current load circuit, electric valve means interconnecting said second alternating current circuit and said load circuit to supply direct current of variable magnitude and either polarity to said load circuit, a control circuit for controlling the conductivities of said electric valve means to vary the magnitude and polarity of the direct current supplied to said load circuit including means energized from said first alternating current circuit for producing an alternating current control voltage having a frequency and phase position dependent upon the frequency and phase position of the voltage of said first alternating current circuit, means for converting said control voltage into a second control voltage having the frequency of said second alternating current circuit and a definite phase relation with respect thereto, said second control voltage being reversible in phase in response to a reversal in phase of said first control voltage and having a magnitude variable in response to variations in the magnitude of said first control voltage.

3. In combination, a first alternating current circuit, a second alternating current circuit, a load circuit, electric valve translating apparatus including a plurality of discharge paths interconnecting said second alternating current circuit and said load circuit, a control electrode for controlling the conductivities of each of said electric discharge paths, means energized from said first alternating current circuit for producing an alternating control voltage having a frequency and phase position dependent upon the frequency and phase position of the voltage of said first alternating current circuit, said alternating control voltage being variable in magnitude in response to a controlling influence and reversal in phase in response to a change in direction of said controlling influence, means including a plurality of electric valves for converting said alternating control voltage into a direct current control voltage, means for converting said direct current control voltage into an alternating control voltage having the same frequency and a definite phase relation with respect to the voltage of said second alternating current circuit, said second alternating control voltage being variable in magnitude and reversible in phase in response to variations in magnitude and a reversal in phase of said first alternating control voltage, and means for impressing said second alternating control voltage on the control electrodes of said electric discharge paths.

GEORGE H. PETTIBONE.
JOHN L. BOWER.

REFERENCES CITED

The following references are of record in the file of this patent:

UNITED STATES PATENTS

| Number | Name | Date |
|---|---|---|
| 1,684,137 | Mittag | Sept. 11, 1928 |
| 1,998,938 | Mittag | Apr. 23, 1935 |
| 2,077,179 | Moseley | Apr. 13, 1937 |
| 2,131,759 | Satterlee | Oct. 4, 1938 |
| 2,409,970 | Agins | Oct. 22, 1946 |
| 2,424,563 | Isbister et al. | July 29, 1947 |

FOREIGN PATENTS

| Number | Country | Date |
|---|---|---|
| 489,271 | Great Britain | July 22, 1938 |